United States Patent
Lee et al.

(10) Patent No.: US 9,288,795 B2
(45) Date of Patent: Mar. 15, 2016

(54) DYNAMIC SUBFRAME SETTING METHOD FOR WIRELESS COMMUNICATION SYSTEM, AND DEVICE FOR SAME

(75) Inventors: Seungmin Lee, Anyang-si (KR); Hanbyul Seo, Anyang-si (KR); Hakseong Kim, Anyang-si (KR); Youngseob Choi, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 103 days.

(21) Appl. No.: 14/003,415

(22) PCT Filed: Mar. 30, 2012

(86) PCT No.: PCT/IB2012/000653
§ 371 (c)(1),
(2), (4) Date: Sep. 5, 2013

(87) PCT Pub. No.: WO2013/008065
PCT Pub. Date: Jan. 17, 2013

(65) Prior Publication Data
US 2013/0336302 A1      Dec. 19, 2013

Related U.S. Application Data

(60) Provisional application No. 61/451,612, filed on Mar. 11, 2011, provisional application No. 61/474,251, filed on Apr. 11, 2011, provisional application No. 61/490,606, filed on May 27, 2011, provisional application No. 61/505,104, filed on Jul. 6, 2011, provisional application No. 61/527,598, filed on Aug. 25, 2011.

(51) Int. Cl.
| H04W 72/04 | (2009.01) |
| H04L 5/00 | (2006.01) |
| H04L 5/14 | (2006.01) |

(52) U.S. Cl.
CPC ........... *H04W 72/0406* (2013.01); *H04L 5/001* (2013.01); *H04L 5/0048* (2013.01); *H04L 5/0096* (2013.01); *H04L 5/1469* (2013.01); *H04W 72/0446* (2013.01); *H04L 5/0055* (2013.01); *H04L 5/0064* (2013.01)

(58) Field of Classification Search
None
See application file for complete search history.

(56) References Cited

U.S. PATENT DOCUMENTS

2009/0073902 A1* 3/2009 Astely et al. ............. 370/280
2009/0201838 A1   8/2009 Zhang et al.

(Continued)

FOREIGN PATENT DOCUMENTS

| KR | 10-2009-0079151 A | 7/2009 |
| KR | 10-2009-0101406 A | 9/2009 |

*Primary Examiner* — Diane Lo
(74) *Attorney, Agent, or Firm* — Birch, Stewart, Kolasch & Birch, LLP

(57) ABSTRACT

The present application discloses a method for a terminal to transmit/receive signals to/from a base station in a wireless communication system. Specifically, the method comprises a first step in which an uplink signal is transmitted from a first subframe and a downlink signal is received from a second subframe, and a second step in which a downlink signal is received from the first subframe and the second subframe if the first subframe has changed so as to be used for the reception of a downlink signal; and the method is characterized in that in the first step a protection space is located between the first subframe and the second subframe, in the second step the protection space is located at the front end of the first subframe, and the first subframe and the second subframes are consecutive.

12 Claims, 11 Drawing Sheets

(56) References Cited

U.S. PATENT DOCUMENTS

| | | | |
|---|---|---|---|
| 2010/0296467 A1* | 11/2010 | Pelletier et al. | 370/329 |
| 2011/0211503 A1* | 9/2011 | Che et al. | 370/280 |
| 2012/0113816 A1* | 5/2012 | Bhattad et al. | 370/246 |
| 2012/0275357 A1* | 11/2012 | Tirkkonen et al. | 370/310 |
| 2013/0315092 A1* | 11/2013 | Yu et al. | 370/252 |

* cited by examiner

FIG. 2
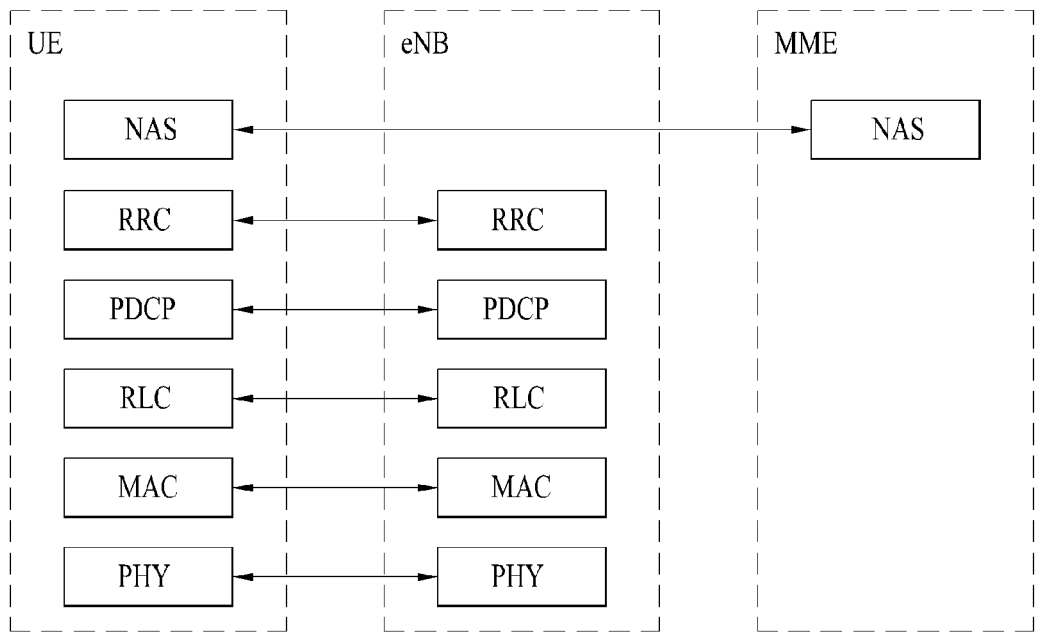
(a) contol - plane protocol stack
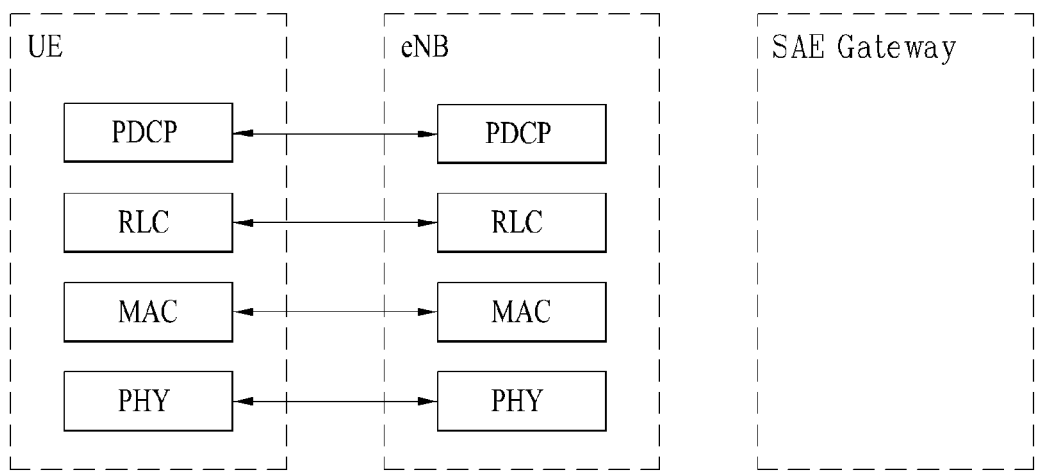
(b) user - plane protocol stack FIG. 6
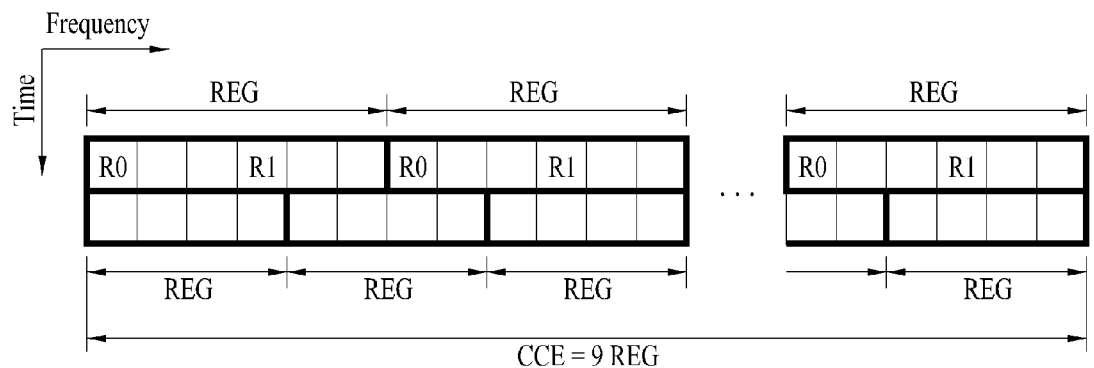
(a) 1TX or 2TX
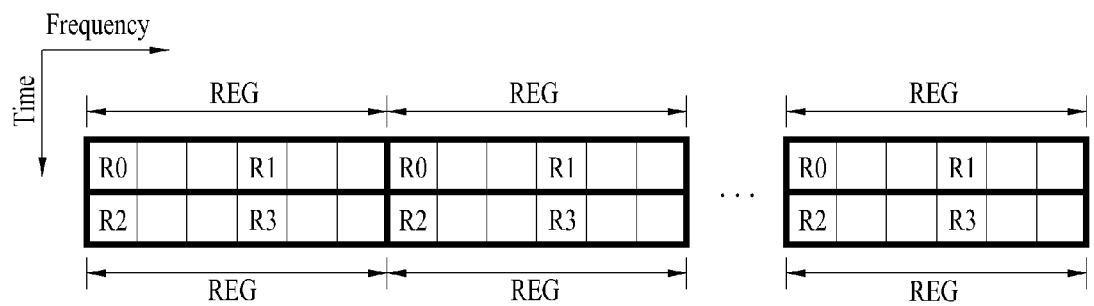
(b) 4 TX
FIG. 7
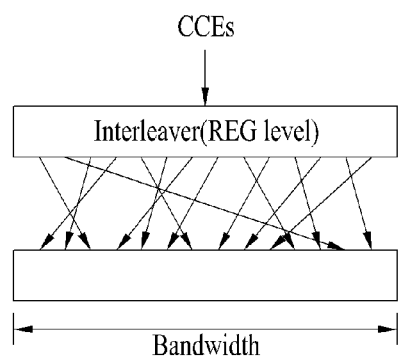

DYNAMIC SUBFRAME SETTING METHOD FOR WIRELESS COMMUNICATION SYSTEM, AND DEVICE FOR SAME

This application is the National Phase of PCT/IB2012/000653 filed on Mar. 30, 2012, which claims priority under 35 U.S.C. 119(e) to US Provisional Application Nos. 61/451,612 filed on Mar. 11, 2011, 61/474,251 filed on Apr. 11, 2011, 61/490,606 filed on May 27, 2011, 61/505,104 filed on Jul. 6, 2011 and 61/527,598 filed on Aug. 25, 2011, all of which are hereby expressly incorporated by reference into the present application.

TECHNICAL FIELD

The present invention relates to a wireless communication system, and more particularly, to a method and apparatus for dynamically configuring a subframe in a wireless communication system.

BACKGROUND ART

A brief description will be given of a $3^{rd}$ Generation Partnership Project Long Term Evolution (3GPP LTE) system as an example of a wireless communication system to which the present invention can be applied.

FIG. 1 illustrates a configuration of an Evolved Universal Mobile Telecommunications System (E-UMTS) network as an exemplary wireless communication system. The E-UMTS system is an evolution of the legacy UMTS system and the 3GPP is working on standardization of E-UMTS. E-UMTS is also called an LTE system. For details of the technical specifications of UMTS and E-UMTS, refer to Release 7 and Release 8 of "$3^{rd}$ Generation Partnership Project; Technical Specification Group Radio Access Network", respectively.

Referring to FIG. 1, the E-UMTS system includes a User Equipment (UE), an evolved Node B (eNode B or eNB), and an Access Gateway (AG) which is located at an end of an Evolved UMTS Terrestrial Radio Access Network (E-UTRAN) and connected to an external network. The eNB may transmit multiple data streams simultaneously, for broadcast service, multicast service, and/or unicast service.

A single eNB manages one or more cells. A cell is set to operate in one of the bandwidths of 1.25, 2.5, 5, 10, 15 and 20 Mhz and provides Downlink (DL) or Uplink (UL) transmission service to a plurality of UEs in the bandwidth. Different cells may be configured so as to provide different bandwidths. An eNB controls data transmission and reception to and from a plurality of UEs. Regarding DL data, the eNB notifies a particular UE of a time-frequency area in which the DL data is supposed to be transmitted, a coding scheme, a data size, Hybrid Automatic Repeat reQuest (HARQ) information, etc. by transmitting DL scheduling information to the UE. Regarding UL data, the eNB notifies a particular UE of a time-frequency area in which the UE can transmit data, a coding scheme, a data size, HARQ information, etc. by transmitting UL scheduling information to the UE. An interface for transmitting user traffic or control traffic may be defined between eNBs. A Core Network (CN) may include an AG and a network node for user registration of UEs. The AG manages the mobility of UEs on a Tracking Area (TA) basis. A TA includes a plurality of cells.

While the development stage of wireless communication technology has reached LTE based on Wideband Code Division Multiple Access (WCDMA), the demands and expectation of users and service providers are increasing. Considering that other radio access technologies are under development, new technological evolutions are required to achieve future competitiveness. Specifically, cost reduction per bit, increased service availability, flexible use of frequency bands, a simplified structure, an open interface, appropriate power consumption of UEs, etc. are required.

DISCLOSURE

Technical Problem

An object of the present invention devised to solve the conventional problem is to provide a method and apparatus for dynamically configuring a subframe in a wireless communication system.

Technical Solution

In an aspect of the present invention, a method for transmitting and receiving a signal to and from a base station at a user equipment in a wireless communication system includes a first step of transmitting an uplink signal in a first subframe and receiving a downlink signal in a second subframe, and a second step of receiving downlink signals in the first and second subframes, if a usage of the first subframe is changed to downlink signal reception. A guard period is interposed between the first and second subframes in the first step, and the guard period is positioned at a start of the first subframe and the first and second subframes are contiguous in the second step.

In another aspect of the present invention, a user equipment in a wireless communication system includes a wireless communication module for transmitting and receiving a signal to and from a base station, and a processor for processing the signal. The process controls the wireless communication module to perform a first step of transmitting an uplink signal in a first subframe and receiving a downlink signal in a second subframe, and a second step of receiving downlink signals in the first and second subframes, if a usage of the first subframe is changed to downlink signal reception. A guard period is interposed between the first and second subframes in the first step, and the guard period is positioned at a start of the first subframe and the first and second subframes are contiguous in the second step.

The guard period may be a transmission-reception switching period. The length of the guard period may be equal to or larger than a timing advance used for timing matching between the user equipment and the base station or a propagation delay.

The second step may further include receiving an indicator indicating change of the usage of the first subframe to downlink signal reception on a physical control channel from the base station. The indicator may be a Carrier Indication Field (CIF) or a Downlink Assignment Index (DAI).

The base station may schedule no other user equipments in the first subframe in the second step.

The user equipment may not perform measurement for Radio Resource Management (RRM) in the first subframe, or may report a measurement result of the first subframe and a measure result of the second subframe separately.

Advantageous Effects

According to the embodiments of the present invention, a dynamic subframe allocation scheme can be performed efficiently in a wireless communication system.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

FIG. 2 illustrates a control-plane protocol stack and a user-plane protocol stack in a radio interface protocol architecture conforming to a $3^{rd}$ Generation Partnership Project (3GPP) radio access network standard between a User Equipment (UE) and an Evolved UMTS Terrestrial Radio Access Network (E-UTRAN);

FIG. 6 illustrates resource units used to configure a control channel;

FIG. 7 illustrates an example of distributing Control Channel Elements (CCEs) across a system band;

BEST MODE FOR CARRYING OUT THE INVENTION

Figure 1:
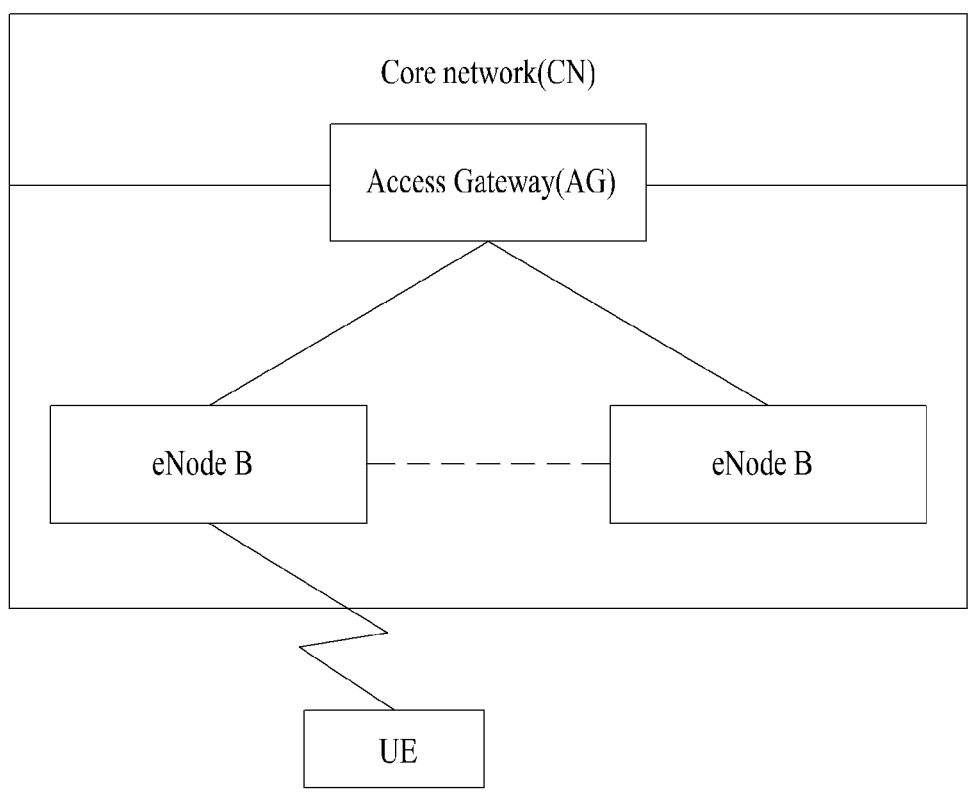
FIG. 1 illustrates a configuration of an Evolved Universal Mobile Telecommunications System (E-UMTS) network as an example of a wireless communication system.

The configuration, operation, and other features of the present invention will readily be understood with embodiments of the present invention described with reference to the attached drawings. Embodiments of the present invention as set forth herein are examples in which the technical features of the present invention are applied to a $3^{rd}$ Generation Partnership Project (3GPP) system.

While embodiments of the present invention are described in the context of Long Term Evolution (LTE) and LTE-Advanced (LTE-A) systems, they are purely exemplary. Therefore, the embodiments of the present invention are applicable to any other communication system as long as the above definitions are valid for the communication system.

FIG. 2 illustrates control-plane and user-plane protocol stacks in a radio interface protocol architecture conforming to a 3GPP wireless access network standard between a User Equipment (UE) and an Evolved UMTS Terrestrial Radio Access Network (E-UTRAN). The control plane is a path in which the UE and the E-UTRAN transmit control messages to manage calls, and the user plane is a path in which data generated from an application layer, for example, voice data or Internet packet data is transmitted.

A PHYsical (PHY) layer at Layer 1 (L1) provides information transfer service to its higher layer, a Medium Access Control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in Orthogonal Frequency Division Multiple Access (OFDMA) for downlink and in Single Carrier Frequency Division Multiple Access (SC-FDMA) for uplink.

The MAC layer at Layer 2 (L2) provides service to its higher layer, a Radio Link Control (RLC) layer via logical channels. The RLC layer at L2 supports reliable data transmission. RLC functionality may be implemented in a function block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of Radio Bearers (RBs). An RB refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

A cell covered by an eNB is set to one of the bandwidths of 1.25, 2.5, 5, 10, 15, and 20 MHz and provides downlink or uplink transmission service in the bandwidth to a plurality of UEs. Different cells may be set to provide different bandwidths.

Downlink transport channels used to deliver data from the E-UTRAN to UEs include a Broadcast Channel (BCH) carrying system information, a Paging Channel (PCH) carrying a paging message, and a Shared Channel (SCH) carrying user traffic or a control message. Downlink multicast traffic or control messages or downlink broadcast traffic or control messages may be transmitted on a downlink SCH or a separately defined downlink Multicast Channel (MCH). Uplink transport channels used to deliver data from a UE to the E-UTRAN include a Random Access Channel (RACH) carrying an initial control message and an uplink SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
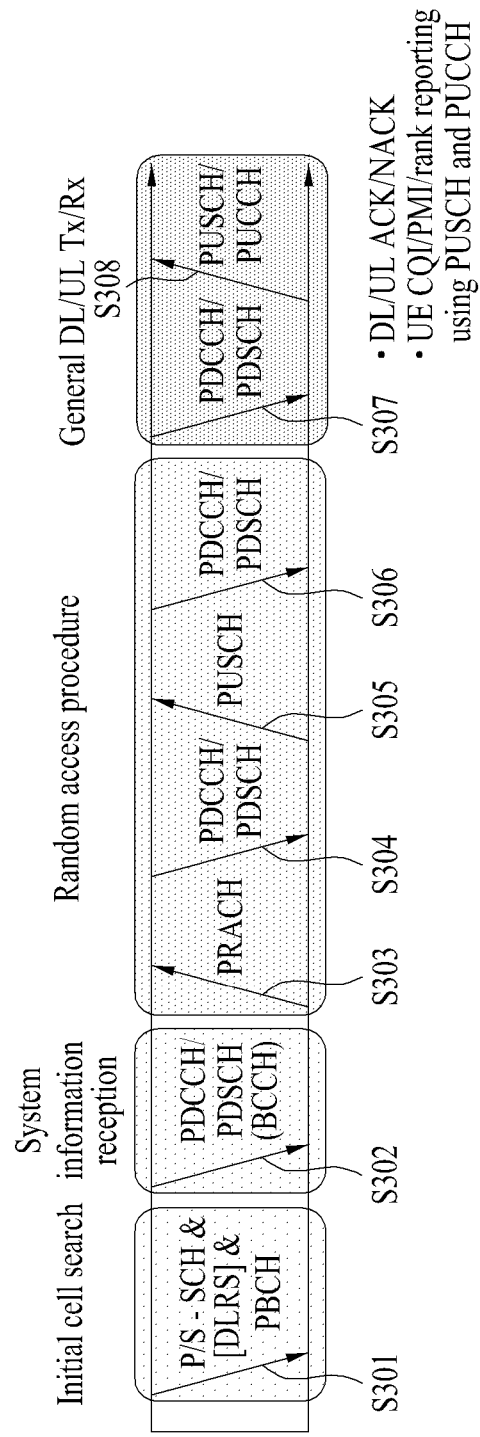
FIG. 3 illustrates physical channels and a general signal transmission method using the physical channels in a 3GPP system.

FIG. 3 illustrates physical channels and a general method for transmitting signals on the physical channels in the 3GPP system.

Referring to FIG. 3, when a UE is powered on or enters a new cell, the UE performs initial cell search (S301). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During the initial cell search, the UE may monitor a downlink channel state by receiving a DownLink Reference Signal (DL RS).

After the initial cell search, the UE may acquire detailed system information by receiving a Physical Downlink Control Channel (PDCCH) and receiving a Physical Downlink Shared Channel (PDSCH) based on information included in the PDCCH (S302).

If the UE initially accesses the eNB or has no radio resources for signal transmission to the eNB, the UE may perform a random access procedure with the eNB (S303 to S306). In the random access procedure, the UE may transmit a predetermined sequence as a preamble on a Physical Random Access Channel (PRACH) (S303 and S305) and may receive a response message to the preamble on a PDCCH and a PDSCH associated with the PDCCH (S304 and S306). In case of a contention-based RACH, the UE may additionally perform a contention resolution procedure.

After the above procedure, the UE may receive a PDCCH and/or a PDSCH from the eNB (S307) and transmit a Physical Uplink Shared Channel (PDSCH) and/or a Physical Uplink Control Channel (PUCCH) to the eNB (S308), which is a general downlink and uplink signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on the uplink or receives from the eNB on the downlink includes a downlink/uplink ACKnowledgment/Negative ACKnowledgment (ACK/NACK) signal, a Channel Quality Indicator (CQI), a Precoding Matrix Index (PMI), a Rank Indicator (RI), etc. In the 3GPP LTE system, the UE may transmit control information such as a CQI, a PMI, an RI, etc. on a PUSCH and/or a PUCCH.

Figure 4:
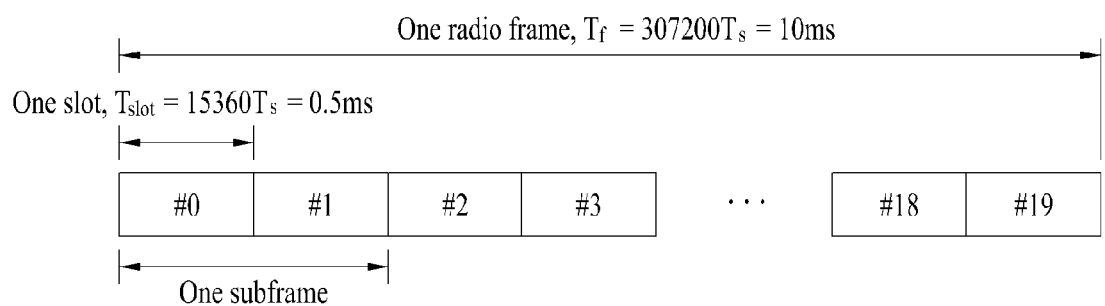
FIG. 4 illustrates a structure of a radio frame in a Long Term Evolution (LTE) system.

FIG. 4 illustrates a structure of a radio frame used in the LTE system.

Referring to FIG. 4, a radio frame is 10 ms (327200×$T_s$) long and divided into 10 equal-sized subframes. Each subframe is 1 ms long and further divided into two slots. Each time slot is 0.5 ms (15360×$T_s$) long. Herein, $T_s$ represents a sampling time and $T_s=1/(15 kHz \times 2048)=3.2552 \times 10^{-8}$ (about 33 ns). A slot includes a plurality of OFDM symbols or SC-FDMA symbols in the time domain by a plurality of Resource Blocks (RBs) in the frequency domain. In the LTE system, one RB includes 12 subcarriers by 7 (or 6) OFDM symbols. A unit time in which data is transmitted is defined as Transmission Time Interval (TTI). The TTI may be defined as one or more subframes. The above-described radio frame structure is purely exemplary and thus the number of subframes in a radio frame, the number of slots in a subframe, or the number of OFDM symbols in a slot may vary.

Figure 5:
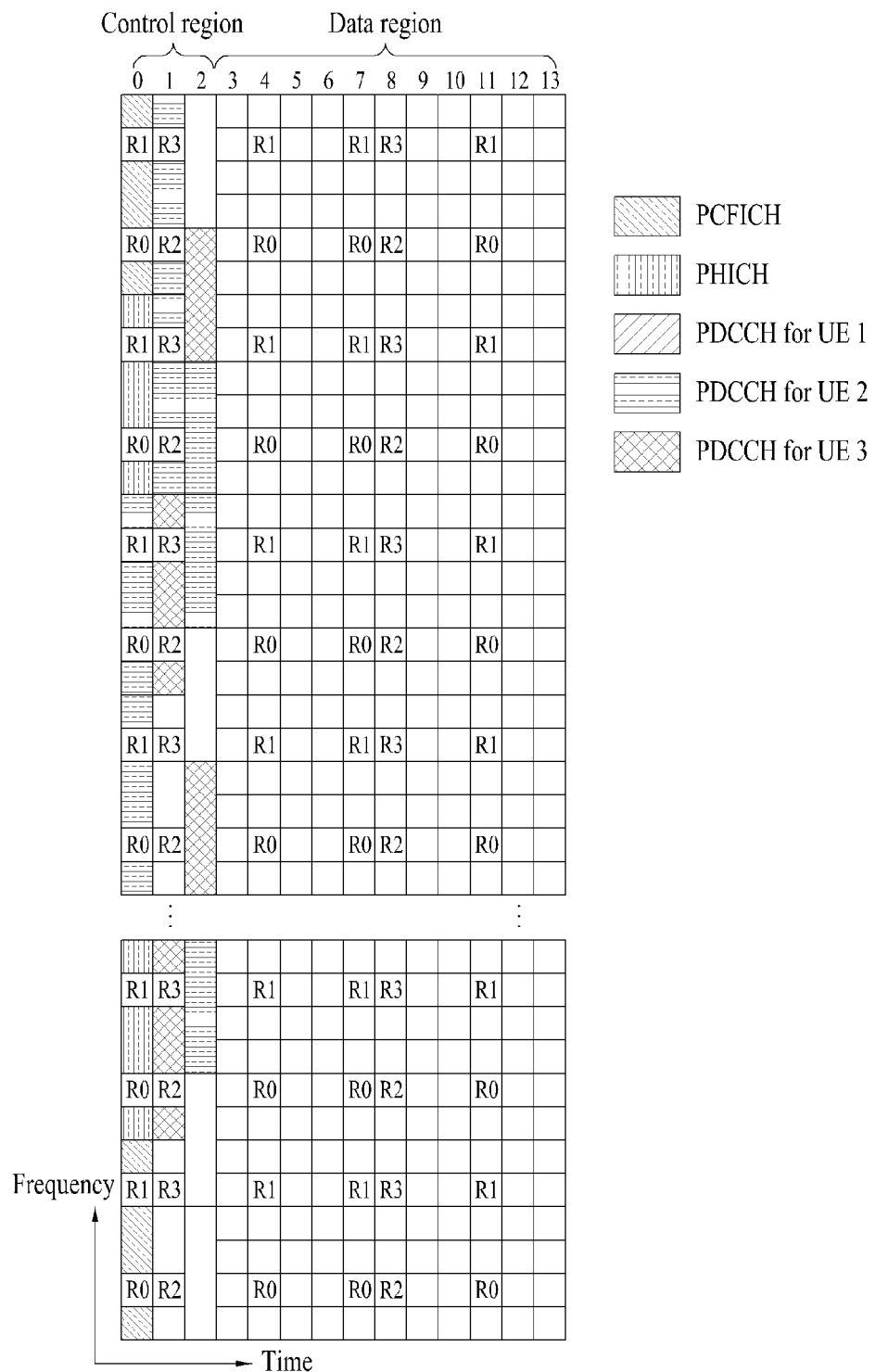
FIG. 5 illustrates a structure of a downlink radio frame in the LTE system.

FIG. 5 illustrates exemplary control channels included in the control region of a subframe in a downlink radio frame.

Referring to FIG. 5, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH is composed of 4 Resource Element Groups (REGs), each REG being distributed to the control region based on a cell Identity (ID). One REG includes 4 Resource Elements (REs). An RE is a minimum physical resource defined by one subcarrier by one OFDM symbol. The PCFICH indicates 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for an uplink transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical downlink control channel allocated to the first n OFDM symbols of a subframe. Herein, n is 1 or a larger integer indicated by the PCFICH. The PDCCH is composed of one or more CCEs. The PDCCH carries resource allocation information about transport channels, PCH and DL-SCH, an uplink scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors a PDCCH using its RNTI information. If one or more UEs have RNTI "A", these UEs receive the PDCCH and receive a PDSCH indicated by "B" and "C" based on information of the received PDCCH.

FIG. 6 illustrates resource units used to configure a control channel. Specifically, FIG. 6(a) illustrates resource units used to configure a control channel, when the number of Transmission (Tx) antennas in an eNB is 1 or 2 and FIG. 6(b) illustrates resource units used to configure a control channel, when the number of Tx antennas in an eNB is 4. Although a different Reference Signal (RS) pattern is used according to the number of Tx antennas, resources unit related to a control channel are configured in the same manner.

Referring to FIG. 6, a basic resource unit of a control channel is an REG. An REG includes 4 contiguous Resource Elements (REs) except for REs used for RSs. A bold square represents an REG in FIG. 6. A PCFICH and a PHICH include 4 REGs and 3 REGs, respectively. A PDCCH is composed of Control Channel Elements (CCE), each CCE including 9 REGs.

To determine whether a PDCCH having L CCEs is destined for a UE, the UE is configured to monitor $M^{(L)}(\geq L)$ CCEs which are contiguous or arranged in a specific rule. The UE may consider plural L values, for PDCCH reception. CCE sets that the UE should monitor for PDCCH reception are called a search space. For example, search spaces are defined as illustrated in [Table 1] below in the LTE system.

TABLE 1

| Type | Search space $S_k^{(L)}$ Aggregation level L | Size [in CCEs] | Number of PDCCH candidates $M^{(L)}$ | DCI formats |
|---|---|---|---|---|
| UE-specific | 1 | 6 | 6 | 0, 1, 1A, 1B, 2 |
| | 2 | 12 | 6 | |
| | 4 | 8 | 2 | |
| | 8 | 16 | 2 | |
| Common | 4 | 16 | 4 | 0, 1A, 1C, 3/3A |
| | 8 | 16 | 2 | |

CCE aggregation level, L is the number of CCEs in a PDCCH, $S_k^{(L)}$ represents a search space of CCE aggregation level L, and $M^{(L)}$ is the number of PDCCH candidates to be monitored in a search space with CCE aggregation level L.

Search spaces may be classified into a UE-specific search space accessible only to a specific UE and a common search space accessible to all UEs. A UE monitors common search spaces with CCE aggregation levels 4 and 8 and UE-specific search spaces with CCE aggregation levels 1, 2, 4, and 8. The common search spaces may be overlapped with the UE-specific search spaces.

The position of a first CCE (i.e. a CCE with a lowest index) in a PDCCH search space assigned to a UE, for each CCE aggregation level is changed in every subframe. This is called PDCCH search space hashing.

FIG. 7 illustrates an example of distributing CCEs across a system band. Referring to FIG. 7, a plurality of logically contiguous CCEs are input to an interleaver. The interleaver permutes the sequence of the plurality of input CCEs on an REG basis. Accordingly, the time/frequency resources of one CCE are physically distributed to a total time/frequency area in the control region of a subframe. As a consequence, while the control channel is configured on a CCE basis, it is interleaved on an REG basis, thereby maximizing a frequency diversity and an interference randomization gain.

Figure 8:
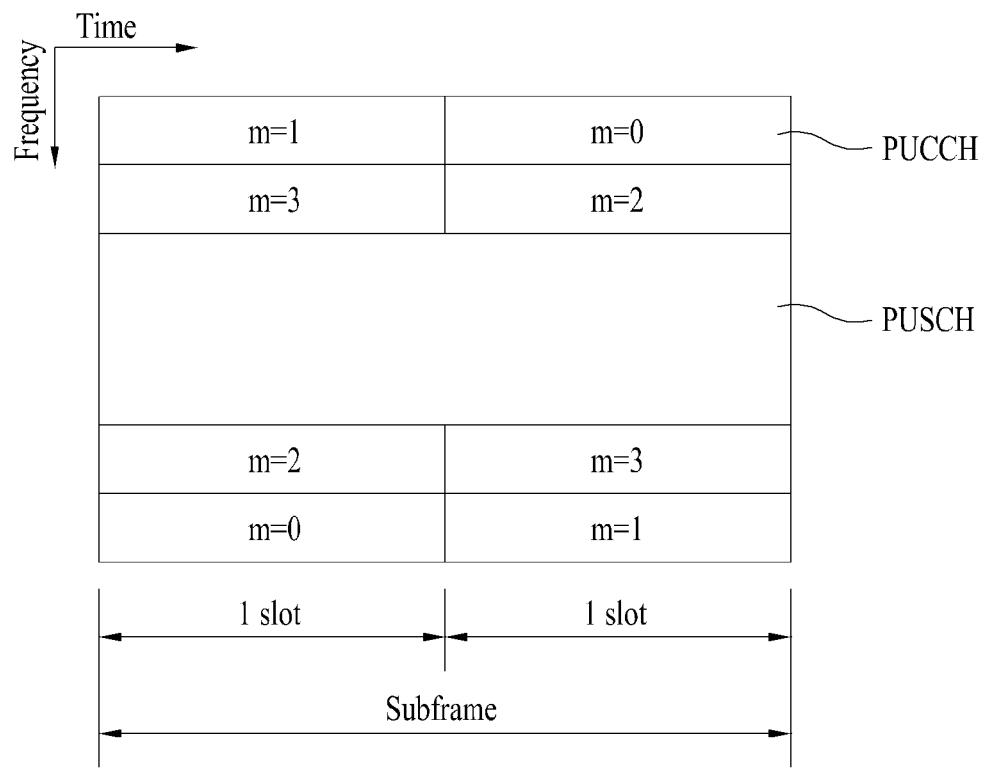
FIG. 8 illustrates a structure of an uplink subframe in the LTE system.

FIG. 8 illustrates a structure of a UL subframe in the LTE system.

Referring to FIG. 8, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for Multiple Input Multiple Output (MIMO), a Scheduling Request (SR) requesting UL resource allocation. A PUCCH for one UE occupies one Resource Block (RB) having a different frequency in each slot of a subframe. That is, the two RBs allocated to the PUCCH frequency-hop over the slot boundary of the subframe. Particularly, PUCCHs with m=0, m=1, and m=2 are allocated to a subframe in FIG. 7.

The present invention provides a method for effectively cancelling possible interference and a subframe Transmission/Reception (Tx/Rx) timing to efficiently support the method, in the case where an eNB dynamically changes the usage of specific radio resources (e.g. DL or UL resources) allocated to a UE to DL or UL usage according to a traffic load change.

Before describing the proposed method in detail, available UL-DL configurations defined in a 3GPP LTE-TDD system will first be described.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In [Table 2], D, U, and S assigned to subframe numbers represent DL subframe, UL subframe, and special subframe, respectively. [Table 3] below lists UL subframe numbers (indexes) for use in transmitting a UL ACK/NACK in response to a DL signal at a UE in the 3GPP LTE-TDD system.

TABLE 3

| UL-DL Configuration | subframe number | | | | | | | | | |
|---|---|---|---|---|---|---|---|---|---|---|
| | 0 | 1 | 2 | 3 | 4 | 5 | 6 | 7 | 8 | 9 |
| 0 | 4 | 7 | — | — | — | 9 | 2 | — | — | — |
| 1 | 7 | 7 | — | — | 8 | 2 | 2 | — | — | 3 |
| 2 | 7 | 7 | — | 7 | 2 | 2 | 2 | — | 2 | 7 |
| 3 | 4 | 2 | — | — | — | 2 | 2 | 3 | 3 | 4 |
| 4 | 2 | 2 | — | — | 2 | 2 | 3 | 3 | 3 | 3 |
| 5 | 2 | 2 | — | 2 | 2 | 2 | 2 | 2 | 2 | 2 |
| 6 | 7 | 8 | — | — | — | 2 | 3 | — | — | 4 |

In [Table 3], '—' represents configuration of a subframe as a UL subframe and a numeral assigned to each subframe number represents the index of a UL subframe linked to a DL subframe having the subframe number.

It may be determined dynamically whether specific radio resources (DL or UL resources) allocated to a UE are used for DL or UL, using a specific field of control information transmitted on a physical control channel as an indicator. For example, the specific field may be a Carrier Indication Field (CIF), a Downlink Assignment Index (DAI), or a UL index. Or a different UL-DL configuration may be indicated by UE-specific dedicated RRC signaling so as to indicate that the usage of specific radio resources has been changed. In another method, a different UL-DL configuration may be indicated by UE-specific dedicated RRC signaling and an indicator indicating whether the usage of specific radio resources has been changed may be additionally transmitted (on a physical control channel). In this manner, the usage of radio resources may be changed.

Figure 9:
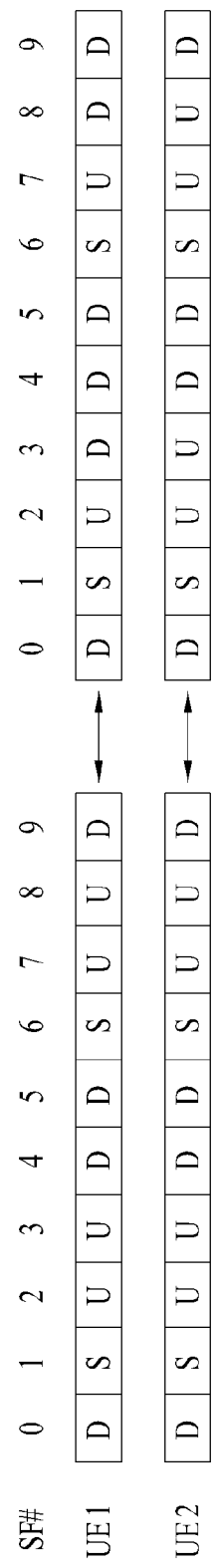
FIG. 9 illustrates an exemplary dynamic subframe configuration scheme.

FIG. 9 illustrates an exemplary dynamic subframe configuration scheme. Particularly, both UE1 and UE2 operate according to UL-DL Configuration #1 in the illustrated case of FIG. 9.

Referring to FIG. 9, while the two UEs are operating according to the same UL-DL configuration, the usage of UL SubFrame (SF) #3 and UL SF #8 of UE1 may be dynamically changed so that they are used for DL transmission. If UE1 and UE2 are connected to the same eNB, scheduling may be performed such that no UL transmission takes place in SF #3 and SF #8 of UE2. Or if UE1 and UE2 are connected to different eNBs, DL transmission from eNB1 to UE1 may interfere with UL transmission from UE2 to eNB2 (eNB-to-eNB interference) or UL transmission from UE2 may interfere with DL reception of UE1 (UE-to-UE interference). To reduce the interference, information about the positions of candidates whose usages may be changed may be shared between cells through an X2 interface (or on a specific preset radio channel). A specific cell may impose some constraint on SF #3 and SF #8 of UE2 from the viewpoint of scheduling or may prohibit UL transmission in SF #3 and SF #8 of UE2 as described before.

On the contrary, if the usage of DL SF #3 and DL SF #8 of UE1 are switched again to UL transmission, the above-described interference does not occur.

Figure 10:
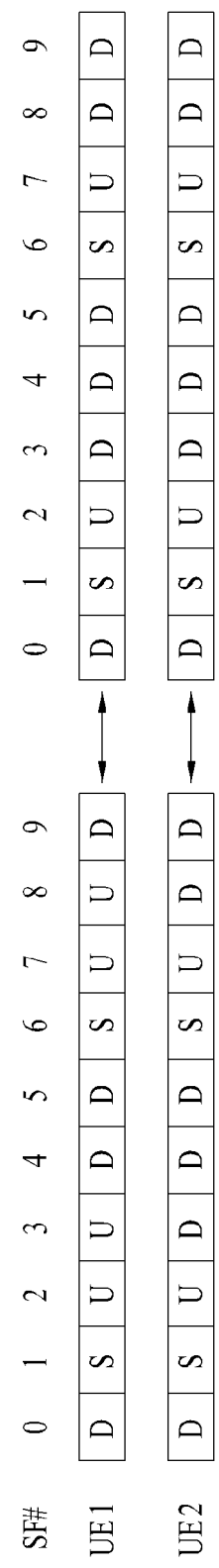
FIG. 10 illustrates another exemplary dynamic subframe configuration scheme.

FIG. 10 illustrates another exemplary dynamic subframe configuration scheme.

Referring to FIG. 10, with different UL-DL configuration set for two UEs, the usage of UL SubFrame (SF) #3 and UL SF #8 of UE1 may be dynamically changed so that they are used for DL transmission. If a DL-UL configuration is changed from the right case to the left case, the interference phenomenon described before with reference to FIG. 9 occurs. Therefore, the foregoing method may be applied to UE1 in the same manner.

If a specific subframe is dynamically changed from a DL subframe to a UL subframe as described above, a measurement such as Radio Resource Management (RRM) is preferably performed in a fixed DL subframe. Since a subframe dynamically configured as a DL subframe is placed in a different interference environment, Channel State Information (CSI) or the like is preferably measured separately by configuring a CSI measurement set. For this purpose, an eNB may indicate to a UE a subframe set for measurement such as RRM/RLM/CSI measurement, taking into account the characteristics of a different interference environment, by higher-layer signaling or physical-layer signaling. Obviously, a neighbor eNB may transmit the signal to a UE connected to the neighbor eNB. For example, the neighbor eNB may transmit measurement-related information to the UE connected to the neighbor eNB. The measurement-related information may be generated based on information about the positions of candidates whose usages are likely to be changed, shared between cells, or measurement-related information of a neighbor cell.

Or if a UL-DL configuration is changed for an individual UE, the UE may perform the measurement only in a DL subframe commonly before and after the UL-DL configuration change. This operation rule may be shared in advance by higher-layer signaling (or physical-layer signaling). When a legacy UE is coexistent with an A-UE for which a DL-UL configuration is dynamically allocated, the legacy UE may perform the measurement only in DL subframes at the same positions as subframes statically (or semi-statically) configured as DL subframes for the A-UE. An eNB may additionally transmit information about the positions of the subframes that the A-UE uses as DL subframes statically (or semi-statically) to the legacy UE by higher-layer signaling (or physical-layer signaling).

In addition, a UE that operates a resource-restricted measurement scheme (e.g. a scheme of performing measurement only in a specific subframe) may not perform the measurement in a DL subframe which was a fixed DL subframe at the moment of setting a restricted measurement region and then has experienced a change in UL-DL configuration. That is, the UE performs the measurement in a DL subframe set whose UL-DL configuration is not changed, from among DL subframes configured as a restricted measurement region. For example, when a UE is switched to another UL-DL configuration (i.e. UL-DL configuration #y) at any time point during resource-restricted measurement according to a specific UL-DL configuration (i.e. UL-DL configuration #x), the measurement may be performed in a subframe configured (or fixed) as a DL subframe in both UL-DL configuration #x and UL-DL configuration #y.

Meanwhile, in the case where the usage of a subframe having a fixed length like an LTE subframe is dynamically changed to UL/DL transmission, it is necessary to design a subframe structure in appropriate consideration of a propagation delay between an eNB and a UE.

Figure 11:
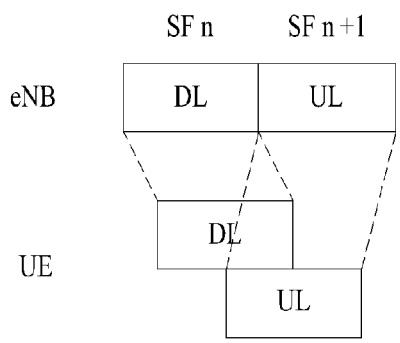
FIG. 11 illustrates a problem encountered with arranging a downlink subframe and an uplink subframe at a predetermined interval in a Time Division Duplexing (TDD) system.

FIG. 11 illustrates a problem encountered with arranging a DL subframe and a UL subframe at a predetermined interval in a TDD system.

Referring to FIG. 11, even though a DL subframe and a UL subframe are arranged at a predetermined interval from the viewpoint of an eNB, the subframes may not be aligned from the viewpoint of a UE due to a propagation delay. Specifically, while the UE receives a DL signal in a DL subframe a predetermined time later, it should transmit a UL signal with an appropriate timing advance in a UL subframe so that the UL signal reaches the eNB at an aligned timing.

To solve this problem, the present invention proposes that when an eNB dynamically configures a UL/DL subframe or the eNB schedules, dynamically changing the usage of a subframe, a subframe structure is designed in consideration of a propagation delay.

Specifically, for the purpose of compensating for a propagation delay, the eNB may set the last or first symbol of each DL or UL subframe as a Guard Period (GP) or puncture the last or first symbol of each DL or UL subframe so that the last or first symbol of each DL or UL subframe may not be used for meaningful signal transmission. This operation may be interpreted as changing the length of the corresponding subframe (or the length of the GP) according to the determined usage of the subframe. Accordingly, the eNB may transmit to the UE information about the length of a subframe configured as a DL or UL subframe or information about the length of a GP in the subframe by broadcasting information or UE-specific signaling.

The present invention further proposes a method for compensating for a propagation delay without setting a GP, when the usage of a specific UL subframe is changed to DL transmission in an LTE TDD UL-DL configuration.

Specifically, a UL subframe satisfying the condition that a subframe next to a subframe subject to radio resource usage change is a DL subframe (or a UL subframe used for DL transmission) is used for DL transmission according to the present invention.

In the LTE TDD system, a special subframe is interposed between a series of DL subframes and a series of UL subframes in order to ensure propagation delay compensation of DL transmission and the timing advance of UL transmission, or a time required to UL-DL switching.

Figure 12:
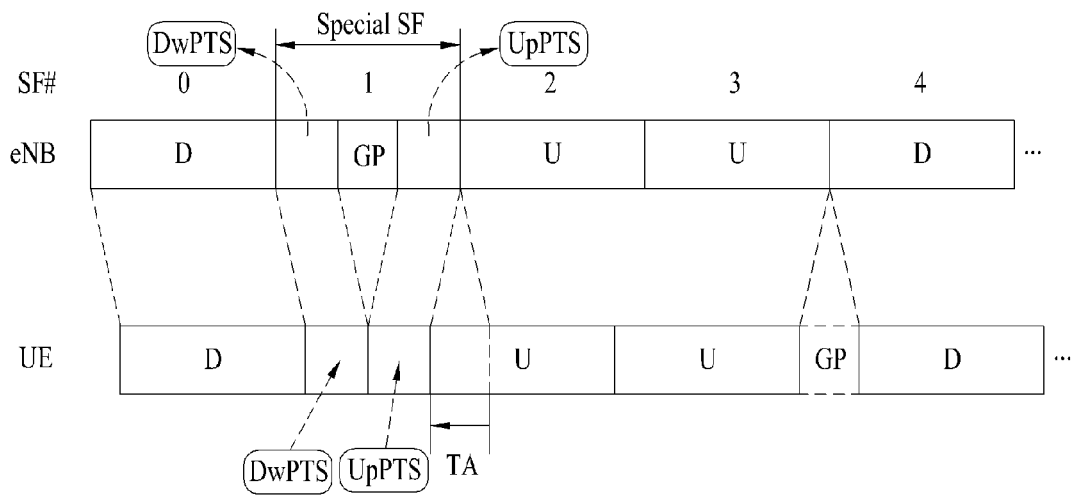
FIG. 12 illustrates a usage of a special subframe in the TDD system.

FIG. 12 illustrates a usage of a special subframe in the TDD system.

Referring to FIG. 12, the special subframe includes a GP. If the length of the GP is adjusted according to a propagation delay, the special subframe is shorter than a general subframe and the transmission timing of a UL subframe is advanced, from the viewpoint of a UE. That is, the UE may perform a timing advance in order to align the reception timing of its UL signal with a UL subframe boundary in an eNB. Therefore, the GP defined for the special subframe prevents overlap between a DL subframe and a UL subframe illustrated in FIG. 11.

Figure 13:
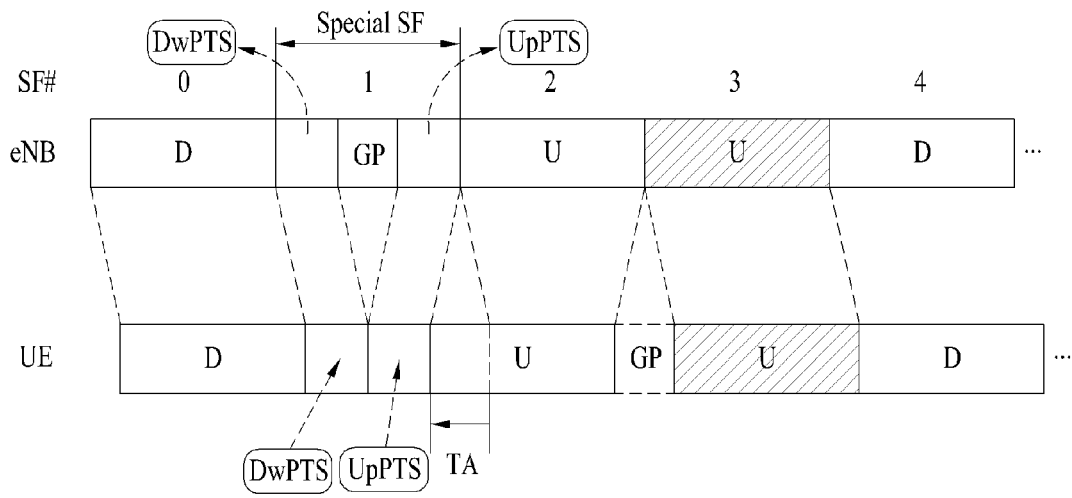
FIGS. 13 and 14 illustrate an example of changing a subframe structure, when a usage of a subframe is dynamically changed according to an embodiment of the present invention.
Figure 14:
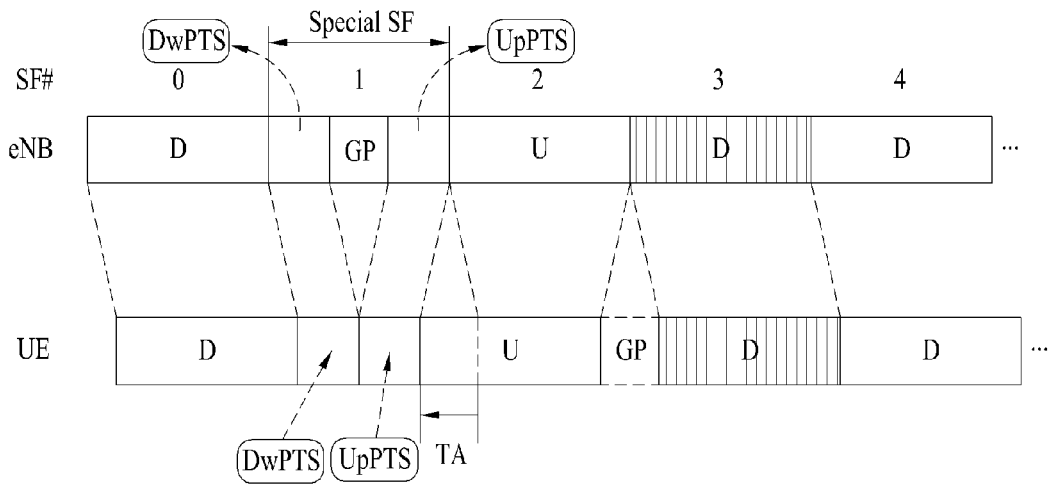

FIGS. 13 and 14 illustrate an example of changing a subframe structure, when a usage of a subframe is dynamically changed according to an embodiment of the present invention.

Referring to FIG. 13, if an eNB dynamically changes UL SF #3 to a DL subframe, UL SF #3 is aligned with the following DL SF #4. With this operation, a timing gap resulting from adjusting the length of a GP in a previous special subframe is useful when UL SF #3 is changed to a DL subframe in usage.

That is, FIG. 14 illustrates the result of using UL SF #3 as a DL subframe after the procedure of FIG. 13. If UL SF #3 preceding DL SF #4 is changed to a DL subframe, all subframes are aligned normally without timing overlap. Therefore, a propagation delay may be compensated for without setting a GP.

Embodiments of the present invention may be implemented for cell-edge UEs experiencing severe interference in an environment where different UL-DL configurations are allocated to neighbor cells. In addition, the present invention may be extended to Carrier Aggregation (CA). For example, the present invention is applicable in the case where a specific Component Carrier (CC) is used commonly in a plurality of cells and each cell sets the usage of the CC independently. In addition, the embodiments of the present invention is applicable in the case where the usage of existing specific radio resources allocated to a Secondary CC (SCC) is changed by Cross Carrier Scheduling (CCS) in a Primary CC (PCC). When the usage of (predefined) specific resources of each CC used for communication between a transmitter and a receiver is changed (dynamically) according to the load state of a system in a CA environment, the present invention may be implemented. The present invention may be extended to every case of communication based on a PDCCH or an Evolved-PDCCH (E-PDCCH). When an extension carrier is additionally used for communication, the present invention may be extended to interference coordination between cells that set the usage of radio resources of the extension carrier or share the extension carrier.

The proposed methods may be extended to Device-to-Device (D2D) communication in a specific frequency band allocated for such communication or use (or reuse) of existing (cell-specific) radio resources for D2D communication by changing the usage of the radio resources in a D2D communication environment.

Figure 15:
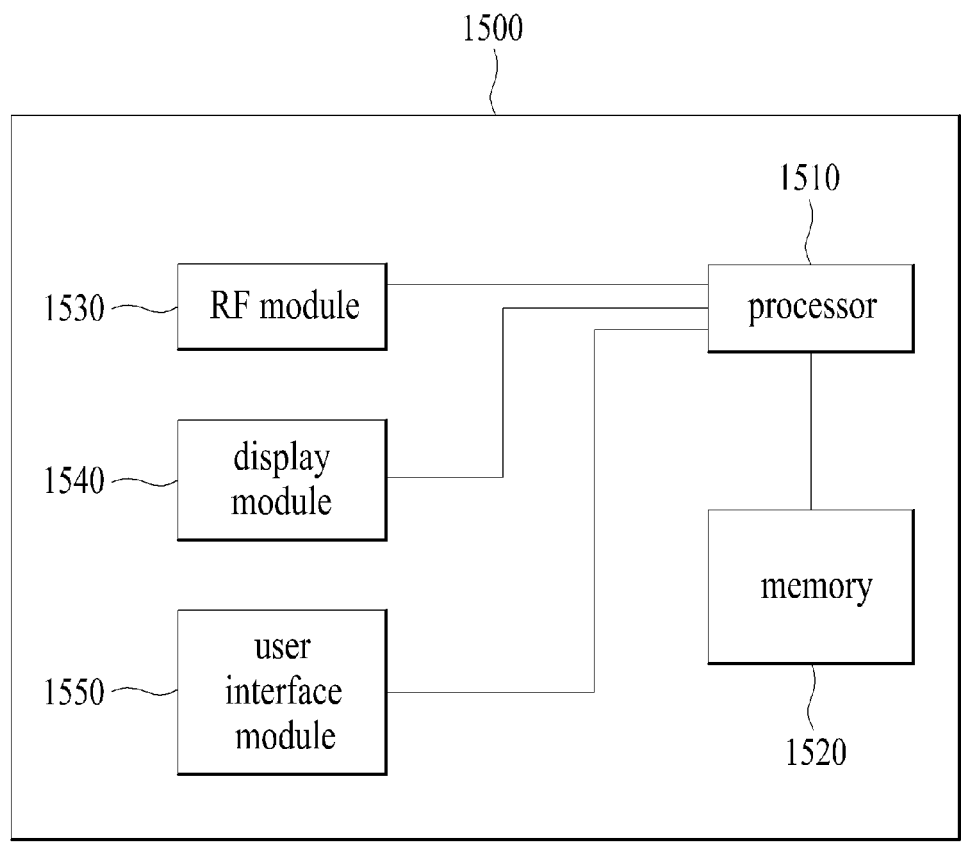
FIG. 15 is a block diagram of a communication apparatus according to an embodiment of the present invention.

FIG. 15 is a block diagram of a communication apparatus according to an embodiment of the present invention.

Referring to FIG. 15, a communication apparatus 1500 includes a processor 1510, a memory 1520, a Radio Frequency (RF) module 1530, a display module 1540, and a User Interface (UI) module 1550.

The communication device 1500 is shown as having the configuration illustrated in FIG. 15, for clarity of description. Some modules may be added to or omitted from the communication apparatus 1500. In addition, a module of the communication apparatus 1500 may be divided into more modules. The processor 1510 is configured to perform operations according to the embodiments of the present invention described before with reference to the drawings. Specifically, for detailed operations of the processor 1510, the descriptions of FIGS. 1 to 14 may be referred to.

The memory 1520 is connected to the processor 1510 and stores an Operating System (OS), applications, program codes, data, etc. The RF module 1530, which is connected to the processor 1510, upconverts a baseband signal to an RF signal or downconverts an RF signal to a baseband signal. For this purpose, the RF module 1530 performs digital-to-analog conversion, amplification, filtering, and frequency upconversion or performs these processes reversely. The display module 1540 is connected to the processor 1510 and displays various types of information. The display module 1540 may be configured as, not limited to, a known component such as a Liquid Crystal Display (LCD), a Light Emitting Diode (LED) display, and an Organic Light Emitting Diode (OLED) display. The UI module 1350 is connected to the processor 1510 and may be configured with a combination of known user interfaces such as a keypad, a touch screen, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the foregoing methods and apparatuses for dynamically configuring a subframe in a wireless communication system have been described in the context of a 3GPP LTE system, by way of example, they are also applicable to various other wireless communication systems.

The invention claimed is:

1. A method for transmitting and receiving a signal to and from a base station at a user equipment in a wireless communication system, the method comprising:
    transmitting an uplink signal in a first subframe and receiving a downlink signal in a second subframe;
    receiving an indicator indicating a change of a usage of the first subframe to a downlink signal reception on a physical control channel from the base station; and
    receiving downlink signals in the first and second subframes, if the usage of the first subframe is changed to the downlink signal reception,
    wherein:
    in the transmitting of the uplink signal in the first subframe and the receiving of the downlink signal in the second subframe, a guard period is interposed between the first and second subframes, and
    in the receiving of the downlink signals in the first and second subframes, the guard period is positioned at a start of the first subframe and the first and second subframes are contiguous, and
    wherein, in the receiving of the downlink signals in the first and second subframes, the user equipment does not perform measurement for Radio Resource Management (RRM) in the first subframe.

2. The method according to claim 1, wherein the guard period is a transmission-reception switching period.

3. The method according to claim 1, wherein the length of the guard period is equal to or larger than a timing advance used for timing matching between the user equipment and the base station or a propagation delay.

4. The method according to claim 1, wherein the indicator is a Carrier Indication Field (CIF) or a Downlink Assignment Index (DAI).

5. The method according to claim 1, wherein, in the receiving of the downlink signals in the first and second subframes, the base station schedules no other user equipments in the first subframe.

6. The method according to claim 1, wherein, in the receiving of the downlink signals in the first and second subframes, the user equipment reports a measurement result of the first subframe and a measure result of the second subframe separately.

7. A user equipment in a wireless communication system, comprising:
    a wireless communication module configured to transmit and receive a signal to and from a base station; and
    a processor configured to:
    process the signal,
    control the wireless communication module to transmit an uplink signal in a first subframe and receive a downlink signal in a second subframe,
    control the wireless communication module to receive an indicator indicating a change of a usage of the first subframe to a downlink signal reception on a physical control channel from the base station, and
    control the wireless communication module to receive downlink signals in the first and second subframes, if the usage of the first subframe is changed to the downlink signal reception, and wherein:
    in the transmitting of the uplink signal in the first subframe and the receiving of the downlink signal in the second subframe, a guard period is interposed between the first and second subframes,
    in the receiving of the downlink signals in the first and second subframes, the guard period is positioned at a start of the first subframe and the first and second subframes are contiguous, and wherein, in the receiving of the downlink signals in the first and second subframes, the user equipment does not perform measurement for Radio Resource Management (RRM) in the first subframe.

8. The user equipment according to claim 7, wherein the guard period is a transmission-reception switching period.

9. The user equipment according to claim 7, wherein the length of the guard period is equal to or larger than a timing advance used for timing matching between the user equipment and the base station or a propagation delay.

10. The user equipment according to claim 7, wherein the indicator is a Carrier Indication Field (CIF) or a Downlink Assignment Index (DAI).

11. The user equipment according to claim 7, wherein, in the receiving of the downlink signals in the first and second subframes, the base station schedules no other user equipments in the first subframe.

12. The user equipment according to claim 7, wherein, in the receiving downlink signals in the first and second subframes, the user equipment reports a measurement result of the first subframe and a measure result of the second subframe separately.

* * * * *